Oct. 26, 1965   D. E. CAIN ETAL   3,213,689
METHOD AND APPARATUS FOR BALANCING ROTORS
Filed Dec. 29, 1960   5 Sheets-Sheet 1

Inventors
Dallas E. Cain
Charles S. Duckwald
by Paul A. Frank
Their Attorney

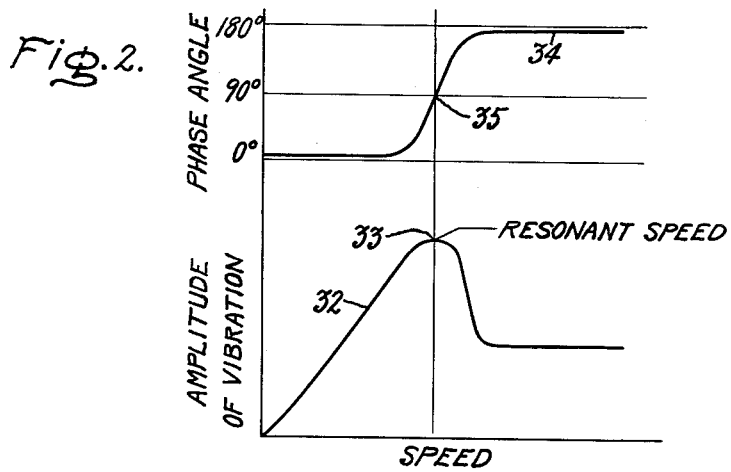
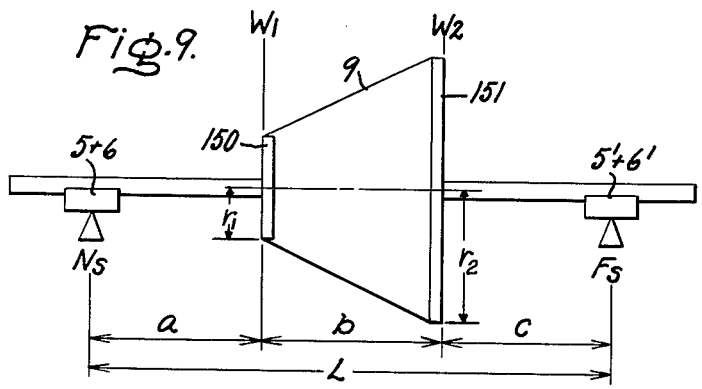
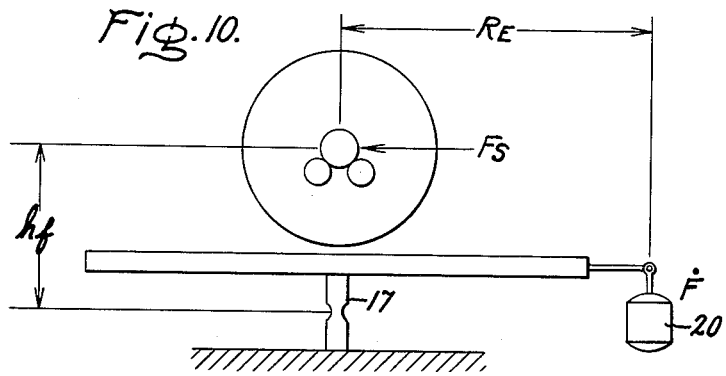

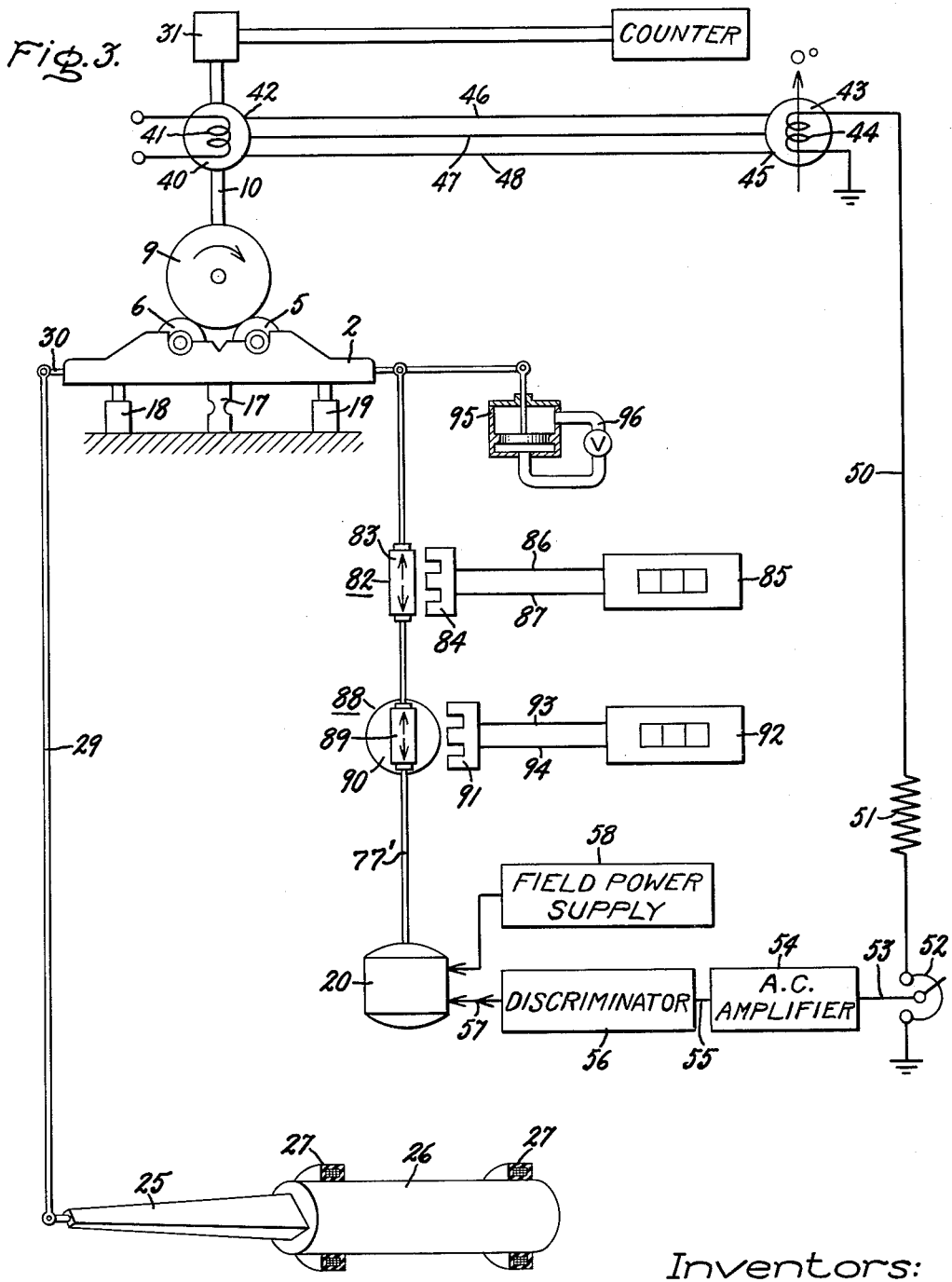

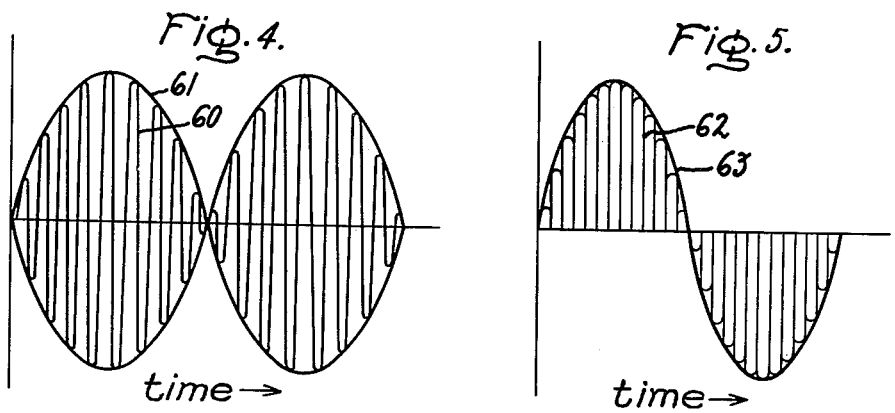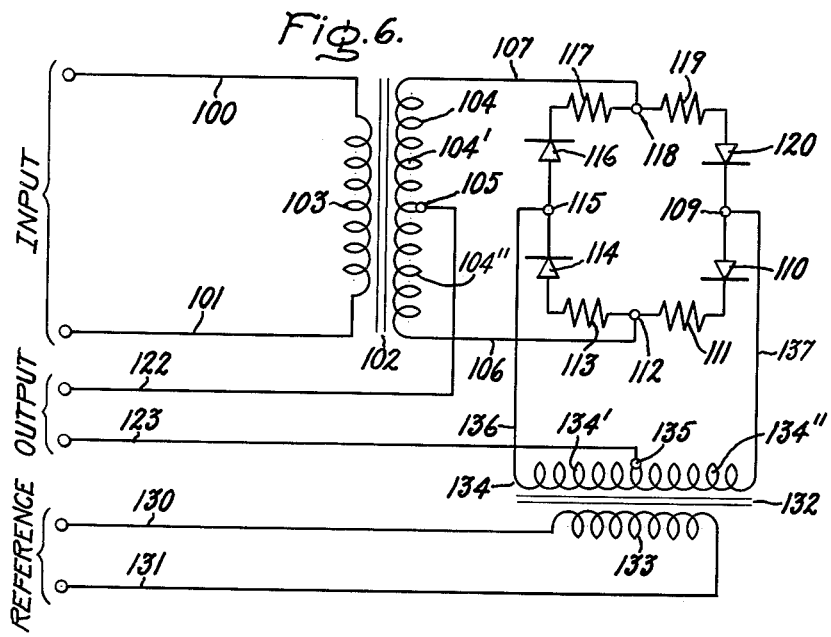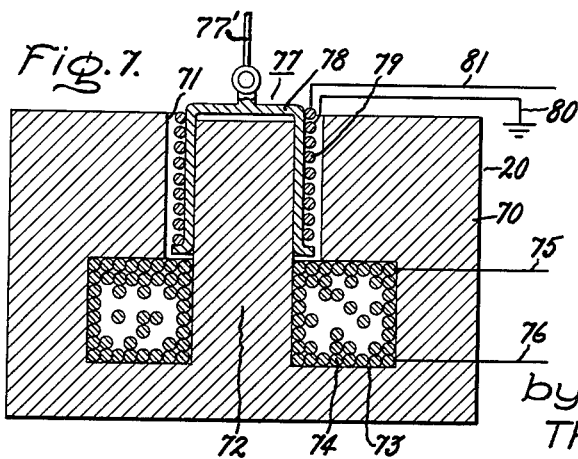

Inventors:
Dallas E. Cain,
Charles S. Duckwald,
by Neil A. Frank
Their Attorney.

3,213,689
METHOD AND APPARATUS FOR BALANCING ROTORS
Dallas E. Cain, Scotia, and Charles S. Duckwald, Schenectady, N.Y., assignors to General Electric Company, a corporation of New York
Filed Dec. 29, 1960, Ser. No. 79,274
1 Claim. (Cl. 73—462)

The present invention relates to a method and apparatus for balancing rotors and, more particularly, to a method and apparatus for dynamically balancing rotors in which the forces utilized to indicate unbalance are translated into suitably located balance weights.

One of the methods for balancing rotors is the "hard" balancing method wherein the rotor is rigidly supported and the balancing operation is performed at below resonant speeds. One of the difficulties encountered by this method is readily and accurately measuring the unbalance forces acting on the rotor. Another difficulty encountered is in maintaining the rigid support required to perform such a test. Another method for balancing rotors is the "soft" method in which the rotor is yieldably mounted in which case the amplitude of vibration is utilized to determine the nature of the unbalance.

The advantage of the "hard" test is that the unbalance force and the resistance force are always in phase. Such a phase relationship does not exist between the unbalance and the amplitude of vibration derived in the "soft" method. It is possible that in the "soft" method, the unbalance may be as much as 180° out of phase with the amplitude of vibration. However, it is known that at resonant speed the phase angle between vibration displacement and the unbalance force is 90°. While it is highly desirable to conduct "soft" tests utilizing this known relationship, precisely determining and operating at resonant speed is not always readily achieved.

Because of the uncertainty that the test is being performed at resonant speed, the usual procedure of balancing, utilizing the soft method has evolved into a trial and error arrangement combined with calculating steps to determine the size and location of balance weights. It is readily appreciated that such a combined method not only requires extensive calculations but the trial and error aspects of the method indicate that the rotor must be brought up to speed, stopped, brought up to speed, and stopped, etc., a great number of times. This is not only excessively time-consuming but it is clearly an approximate method of balancing.

The chief object of the present invention is to provide an improved method and apparatus for balancing a rotor which requires a minimum number of start and stop operations to expeditiously determine the weights required to balance a rotor.

Another object of the invention is to provide a method and apparatus for dynamically balancing a rotor and translating the balancing forces into at least two equivalent weights to be mounted on the rotor.

A still further object of the invention is to provide improved means for translating balancing forces into balancing weights for rotors.

These and other objects of our invention will be more readily perceived from the following description.

Briefly stated, the invention relates to the balancing of rotors in which a rotor may be rotated, preferably at resonant speed, and while so rotated, vector forces are applied to the rotor to substantially eliminate the vibrations. The magnitude and phase of the vector forces are measured and translated into at least two balance weights to be attached on the rotor to balance the rotor.

The attached drawings illustrate a preferred embodiment of the invention, in which:

FIGURE 2 is a diagram plotting speed vs. amplitude of vibration and phase angle;

FIGURE 3 is a schematic view of the test equipment located on one end of the apparatus shown in FIGURE 1;

FIGURE 4 is a diagram illustrating the electrical signal supplied to the discriminator utilized in the apparatus shown in FIGURE 3;

FIGURE 5 is a diagram illustrating the output signal from the discriminator utilized in the apparatus shown in FIGURE 3;

FIGURE 6 is a schematic view of the discriminator;

FIGURE 7 is a sectional view of a force generator for use in the apparatus in FIGURE 1;

FIGURE 9 is a diagrammatic side view of the stand and rotor; and,

FIGURE 10 is a diagrammatic end view of the stand and rotor.

Figure 1:
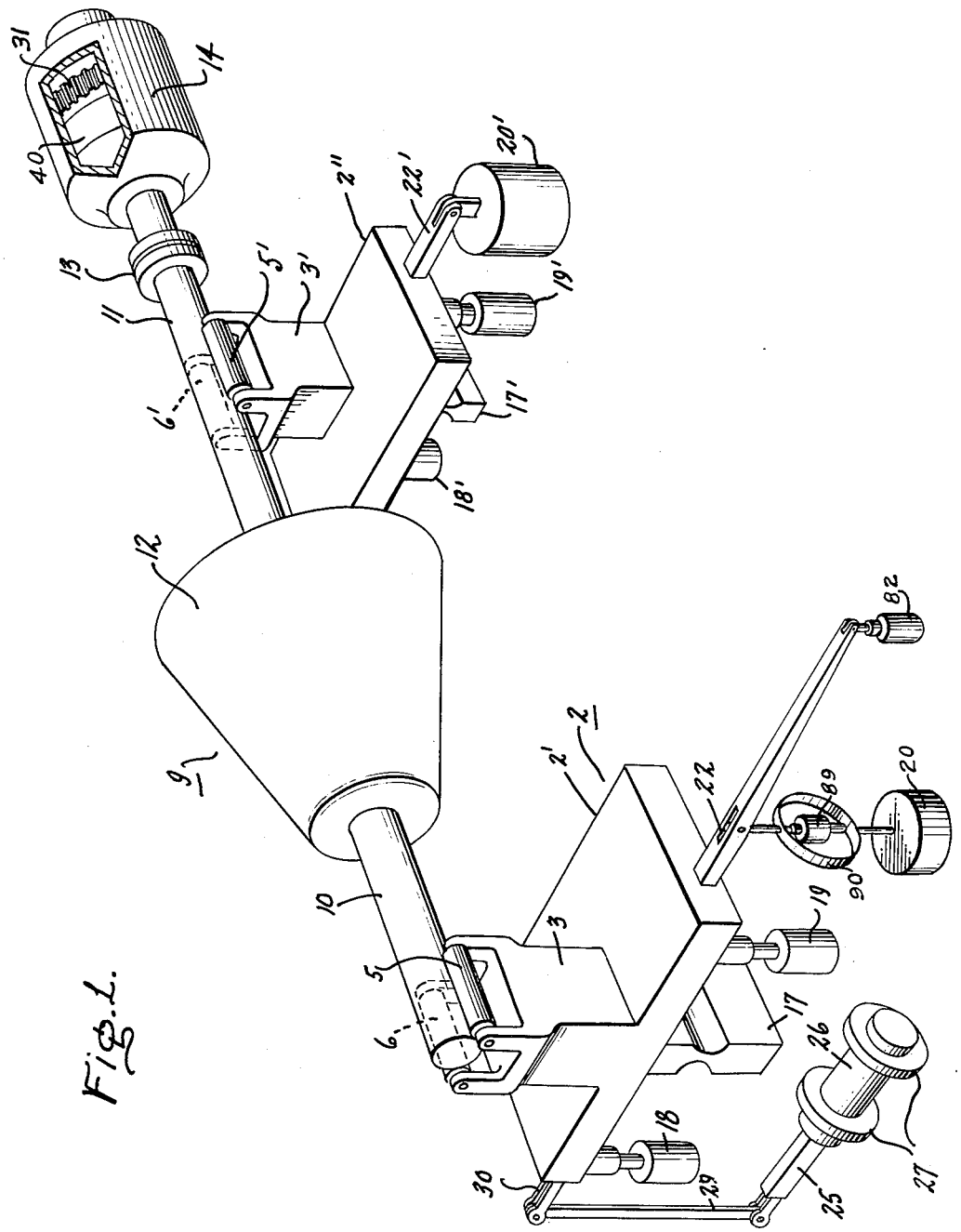
FIGURE 1 is a perspective view of a balancing apparatus for practicing the present invention.

In FIGURE 1 there is shown a test stand for balancing rotors, such as turbine rotors, in accordance with the present invention. Test stand 2 comprises a near side 2' and a far side 2". Near side 2' has mounted pedestal 3 thereon and pedestal 3' is located on far side 2". The pedestals include respective pairs of rollers 5 and 6 and 5' and 6' upon which the rotor shaft may be rotatably supported. In the present embodiment there is shown turbine rotor 9 having a shaft portion 10 supported on near side 2' and a shaft 11 supported on far side 2". Bladed section 12 of the rotor is located intermediate pedestals 3 and 3'.

In accordance with the present invention, to dynamically balance the rotor it is necessary to supply means to rotate the rotor such as connecting motor 14 to shaft 11 by means of flexible coupling 13. Near side 2' and far side 2" of test stand 2 preferably are supported on flexures 17 and 17', flexure 17 being located on the near side of the stand and flexure 17' being located on the far side. These flexures which may take many forms, provide pivot points to yieldably mount the stand and are preferably in vertical alignment with the rotor shaft axis.

By utilizing flexures 17 and 17', it is noted that a "soft" type test is utilized. However, in testing the rotor, rather than permit the entire stand to vibrate, the preferred practice according to the present invention is to restrain one end of the test stand while necessary data is being taken from the free end. This process is reversed and the other end of the stand is restrained. In order to restrain the stand, suitable jacks 18, 19, and 18' and 19' may be supplied on each side of the test stand. These jacks may be mechanically or hydraulically operated to individually engage the near and far sides in such a manner as to substantially prevent movement of these sides.

As previously noted, it is desirable to conduct "soft" mounting tests of rotors at resonant speed. Resonance is a function of the stiffness with which the rotor and stand are supported. Since the rotor is uncovered, it is preferable to run the test at substantially less than operating speed, for example, in the area of 300 r.p.m. and lower. To achieve resonance at such low speeds, variable resilient means are provided for supporting one edge of each side of the stand. Such variable resilient means is provided by a variable gradient spring means. In the present embodiment, such a construction comprises a resilient cantilever member 25 having a cylindrical anchoring portion 26 which is mounted on bearings 27. Rotation of the mounting portion varies the moment of inertia of cantilever 25 in such a manner as to vary the stiffness of the spring. The end of cantilever spring 25 may be connected by link 29 to arm 30 extending from the edge of stand 2. A counter 31 shown in FIGURE 3 may be attached to the rotor during balancing. A variable spring apparatus is described in copending application, Serial No. 117,384, Raymond W. Kunz, inventor, which is assigned to the assignee of the present invention, and is now abandoned.

In FIGURE 2 there are shown diagrams plotting amplitude of vibration and phase angle of the vibration vs. speed. It is noted that as the speed of the rotor increases, the amplitude of vibration increases as shown by line 32 until vibration reaches a maximum at resonant speed, shown at point 33, and then sharply declines to a lower level of amplitude of vibration. From the steepness of curve 32, it can be seen that in order to base balancing on amplitude of vibration, it is necessary to be assured that resonant speed has been precisely achieved. This condition also can be seen by the plot of speed vs. phase angle. At speeds less than resonant speed, the phase angle is in the area of zero degrees. As resonant speed is approached, the phase angle rapidly changes and at resonant speed passes through 90° at point 35. This change in phase angle rapidly approaches 180° and remains in this area 34 at speeds greater than resonant speed. As previously mentioned, it is more practical to apply balancing forces rather than measure amplitudes since the balancing forces are in phase with the unbalance.

The present invention envisions dynamically balancing the rotor by supplying a vector force to the rotor in such a manner as to substantially equal the unbalance force generated by the rotating rotor. In the present embodiment, to apply such a vector force to the shaft axis, the force is applied to the edge of the stand by means of force-applying means or force generators 20 and 20' which are connected to arms 22 and 22' extending from the edge of stand 2. It is desirable during the balancing operation to bring rotor 9 to resonant speed by varying the stiffness of springs 25 which are located on the near and far sides of the test stand 2. When such resonant condition is achieved, the force-applying means is adjusted so that restraining force is applied to the stand (and the rotor) at a phase angle and magnitude equal to the force generated by the unbalance in the rotating rotor. When this condition is reached, the vibration due to unbalance in the rotor is substantially eliminated.

FIGURE 3 illustrates a schematic view of the balancing apparatus utilized on the near side of the stand illustrated in FIGURE 1. This equipment preferably is duplicated on the far side of the apparatus so that when balancing is being performed on the near side with the far side restrained, the operation may be reversed and necessary equipment is available on the far side.

In determining the angle of vector forces to be applied to the rotor axis, it is desirable to use the rotor as a datum. With this in mind, a suitable selsyn generator 40 having its rotor 41 energized by a datum voltage and having a datum frequency, for example, 400 cycles, may be connected to shaft 10 of rotor 9. Rotor 41 is inductively associated with a three-phase stator winding 42 which is connected to three-phase stator winding 45 of a remote selsyn motor 43 through conductors 46, 47, and 48. The stator windings of selsyn motor 43 are inductively associated with rotor 44, rotor 44 being adjustably restrained and calibrated to indicate the angular orientation of the rotor shaft.

One end of the rotor winding of selsyn motor 43 may be grounded, the second end is connected by conductor 50 through resistor 51 to potentiometer 52. The function of potentiometer 52 is to control the magnitude of the vector force which will be applied through the force-applying means 20 to test stand 2. This is achieved by regulating the amplitude of the electrical signal supplied to force-applying means 20. By energizing the rotor of selsyn generator 40 with a voltage having a given frequency because of the inductive relationship with stator 42, there is impressed through conductors 46, 47, and 48 a signal which is induced into the windings of rotor 44 of selsyn motor 43. The angular orientation of the rotor 44 with respect to the generator rotor 41 of selsyn generator 40 determines the amplitude of the signal passed from selsyn motor 43; the position of rotor 44 of selsyn motor 43 consequently being also an indication of the vector angle of the restraining force required to dampen the vibration due to the unbalance of rotor 9. The nature of the signal being passed from selsyn rotor 44 is illustrated in FIGURE 4 and shows a modulation envelope 61 containing a carrier wave 60. Carrier wave 60 is at datum frequency and as shown in FIGURE 4 is changing sinusoidally for one revolution of rotor 9 during balancing. The phase relationship between the envelope 61 and rotor 9 is changed by adjustment of the stationary position of selsyn rotor 44.

It is desirable to amplify signals from selsyn motor 43 through an alternating current amplifier which may be a conventional audio amplifier since the frequency of the signal being amplified may be, for example, in the range of 400 cycles. The amplified signal is supplied over conductor 55 to a suitable discriminator 56 whose function is to convert the wave form (shown in FIGURE 4) generated by selsyn motor 43, whose amplitude has been varied by potentiometer 52 and amplified by amplifier 54 to a desired wave form, for example, a sine configuration to be supplied to the force-applying means 20 at a frequency synchronous with the rotation of the rotor. The nature and operation of discriminator 56 is more fully described hereinafter.

The wave form of the signal supplied to conductor 57 from discriminator 56 is illustrated in FIGURE 5 and comprises a modulation wave 62 having an envelope 63. The signal is supplied to force generator 20 which may comprise, for example, an electromagnetic device having the general nature of a speaker, the armature of which is intended to create forces of an amplitude as great as 25 lbs. and accommodate displacements of a total amplitude of 1 in.

FIGURE 7 illustrates an example of a force generator which may be utilized with the apparatus shown in FIGURES 1 and 3. Force generator 20 comprises a magnetic housing 70 having an opening 71 with an extended portion 73 located in the bottom portion thereof, this extended portion 73 being adapted to house magnetic coil 74 which is connected by means of conductors 75 and 76 to the power supply 58 shown in FIGURE 3. A cylindrical protuberance 72 which constitutes a portion of housing 70 extends the full length of opening 71 and at the upper portion thereof, is substantially enveloped by armature 77. Armature 77 comprises a cup-shaped member 78 having a winding 79 connected through conductor 80 to ground and through conductor 81 to the discriminator 56 illustrated in FIGURE 3. As previously mentioned, the operation of force generator 20 is similar to a speaker which has windings suitably energized to pass magnetic lines of flux through an energized armature winding 79, the nature of the electrical signal being passed through armature winding 79 directly determining the nature of the force supplied by armature 77.

In order to determine when a condition of unbalance has been compensated by a vector force applied to the test stand, suitable displacement sensing means 82 may be utilized to read directly the amount of displacement of the test stand and, when zero displacement has been achieved, to note this condition. Displacement sensing means 82 may comprise a suitable transducer such as a variable reluctance displacement transducer which comprises an armature 83 which may be associated with the armature 77 of the force generator 20 or may be directly connected to test stand 2. Armature 83 may be inductively associated with a stator 84 which senses the position of armature 83 and provides a signal through conductors 86 and 87 to the peak reading voltmeter 85 which may be calibrated to indicate directly the amount of displacement.

A similar transducer 88 may be utilized to measure the force being applied by armature 77 to test stand 2. This transducer may comprise an armature 89 which is mounted within and adjacent one end of resilient ring 90. This end of the flexible ring is directly connected to armature 77 by rod 77' and the other end carries stator 91 and is associated with the test stand through a connection with armature 83 of transducer 82. In this embodiment of the transducer 88, the ring 90 is therefore suitably mounted to transmit the force created in the generator 20, and in doing so, ring 90 is distorted in such a manner as to cause relative movement of armature 89 and stator 91. Since ring 90 is elastic, relative movement of armature 89 and stator 91 is proportional to the force being applied. The relative position of armature 89 is sensed by stator 91 which is connected by means of conductors 93 and 94 to peak reading voltmeter 92 which indicates the maximum force being applied to the test stand. Voltmeter 92 may be directly calibrated in pounds.

In conducting a test on a suitable rotor, it is desirable at certain times to limit the vibration of the stand 2 and this may be achieved by attaching to the stand directly a suitable dash pot 95 whose damping function may be varied by a valve 96.

From the above consideration of the system including selsyns 40 and 43, the alternating current amplifier 54, discriminator 56, and force generator 20, it is noted that the function of this particular portion of the apparatus is to apply a low frequency force to test stand 2. This force which is synchronized with the rotation of the rotor constitutes a vector force to compensate for the unbalance in the rotor being tested. FIGURE 4 illustrates the general nature of the electrical signal being generated by selsyn motor 43 and amplified by amplifier 54. FIGURE 5 illustrates the wave form supplied to the force generator 20 which ultimately restrains the test stand by supplying a vector force equal to the vector force generated by the unbalance of the rotor. As previously noted, wave 63 comprises a signal which is of an extremely low frequency, for example, below 5-cycles/second and which is synchronous with the speed of the rotor on the test stand and has a phase angle which may be controlled by positioning rotor 44 and is measured by reading the position of rotor 44 of selsyn motor 43.

To convert the wave form of FIGURE 4 to the usable wave form of FIGURE 5, it is, therefore, necessary to utilize a discriminator which performs the function of a synchronous rectifier, that is, the input wave shown in FIGURE 4 is converted to the wave illustrated in FIGURE 5 by the utilization of a suitable reference frequency which controls the polarity of the output voltage of the discriminator.

FIGURE 6 schematically illustrates a ring demodulator with associated transformers which performs this desired function. The input wave from alternating current amplifier 54 is supplied to the discriminator through input conductors 100 and 101. These conductors are connected to the primary winding 103 of step-up transformer 102 which has a secondary winding 104 divided by center tap 105 into a first section 104' and a second section 104". In the illustrated embodiment, the magnitude of the voltage of the signal impressed on conductors 100 and 101 may vary from zero to as much as 70 volts. The reference voltage applied to the reference conductors 130 and 131 may have a higher potential, for example, 115 volts, and is of the same frequency as the input voltage. This reference voltage is impressed across primary winding 133 of step-up transformer 132 which has a secondary winding 134 divided by center tap 135 into a first section 134' and a second section 134". Center tap 135 is connected to the output conductor 123 while center tap 105 of the secondary winding of transformer 102 is connected to output conductor 122. The secondary winding 134 of transformer 132 is connected to conductors 136 and 137 which are connected respectively to terminal points 115 and 109.

In the operation of the ring demodulator, when a voltage is impressed across secondary winding 134 in one direction such that conductor 136 is more positive than conductor 137, current flows through conductor 136, terminal point 115, rectifier 116, resistance 117, terminal point 118, resistance 119, rectifier 120, terminal point 109, and conductor 137 to the secondary winding. When the direction of current flow is reversed, the circuit includes conductor 137, terminal point 109, rectifier 110, resistance 111, terminal point 112, resistance 113, rectifier 114, terminal point 115, and through conductor 136 to the secondary winding 134.

Since the reference voltage supplied to conductors 130 and 131 is a magnitude greater than the input voltage, the polarity of the reference voltage at a given time determines the direction of reference current flow through the network including rectifiers 110, 114, 116, and 120 and resistances 111, 113, 117, and 119. Accordingly, it will be appreciated that when current flows through rectifier 116, resistance 117, resistance 119, and rectifier 120, the input current flow, when conductor 107 is more positive than center tap 105, from transformer 102 is through conductor 107, terminal point 118, resistances 119 and 117, rectifiers 120 and 116, conductors 137 and 136, through the sections 134' and 134" of secondary winding 134 of transformer 132 through center tap 135 to output conductor 123. Similarly, when the reference current flow is through rectifier 110, resistance 111, resistance 113, rectifier 114, and conductor 106 is now positive with respect to center tap 105, the flow of input current is through conductor 106, terminal point 112, resistances 113 and 111, rectifiers 114 and 110, terminal points 115 and 110, conductors 136 and 137, sections 134' and 134" of secondary winding 134 of transformer 132, center tap 135 and output conductor 123.

If, on the other hand, the phase of the input signal is such that when conductor 136 is positive with respect to conductor 137, conductor 107 is negative with respect to center tap 105, the flow of current is from tap 105, to output conductor 122, return through conductor 123, through mid tap 135, sections 134' and 134", conductors 136 and 137, points 109 and 115, rectifiers 116 and 120, resistances 117 and 119, point 118, and return to section 104' through conductor 107.

From the above description, it can be seen that the phase of the reference voltage determines which of the rectifiers conducts, further determining the polarity of the output voltage at conductors 122 and 123. In this manner, the signal having a desired wave form impressed upon force generator 20 results in the application of a vector force to test stand 2 to substantially eliminate the vibration due to unbalance in the rotor.

Figure 8:
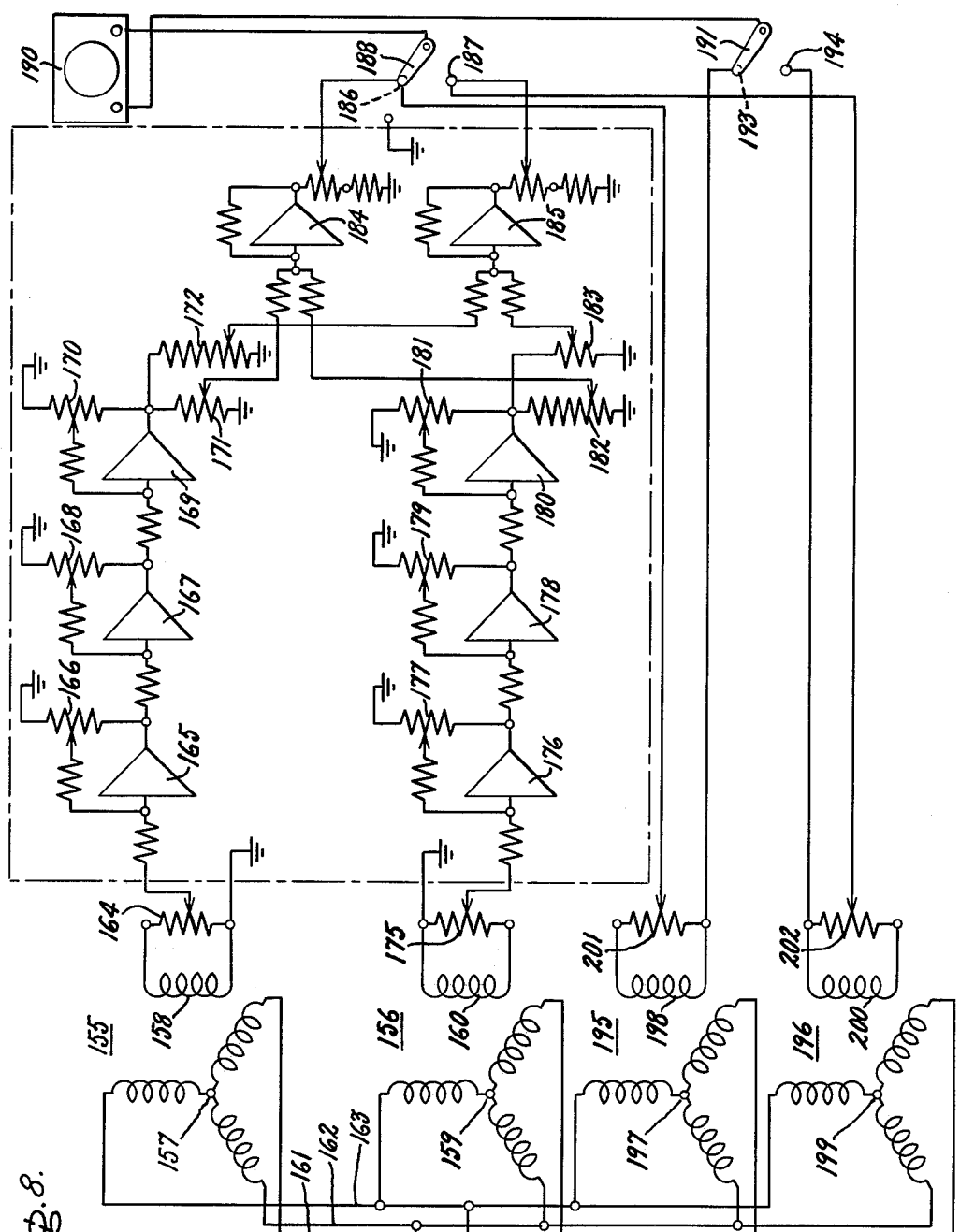
FIGURE 8 is a schematic view of a computer which may be utilized with the apparatus in FIGURE 3 to translate the vector forces into suitable balance weights.

In FIGURE 8 there is shown a schematic drawing of a computer which may be utilized in the present invention for converting the vector information derived from the apparatus illustrated in FIGURE 3 into suitable weights located on the rotor to balance the rotor. FIGURE 9 is a side view of rotor 9 having two balance planes 150 and 151 upon which weights may be placed to balance the rotor. By balancing one end of the rotor and restraining the other end of the rotor, a balancing force at an angle $\theta_N$ is determined. The other end of the machine may be similarly balanced with another force at angle $\theta_F$. Each of these forces may be reproduced by a pair of weights, one in each plane 150 and 151 of calculated sizes at predetermined distances from the center of the rotor and referenced to the angle $\theta_1$ and $\theta_2$ indicated by selsyn motor 43 shown in FIGURE 3. The two weights in each balance plane may be replaced by a single weight which is the vector sum of the weights in each plane. In order to perform the function of translating the vector forces into a single balancing weight per plane, the analogue computer in FIGURE 8 may be utilized.

The force read on peak reading voltmeter 92 in FIGURE 3 is a force having a proportional relationship to the vector force required to substantially eliminate the vibration of rotor 9. Assuming that the forces read on the peak reading voltmeters 92 are $\dot{F}$ and $\dot{N}$, the relationship is created wherein:

$$\dot{F}_s = \dot{F} \times \frac{R_e}{h_f} \text{ and } \dot{N}_s = \dot{N} \times \frac{Re}{h_n}$$

where $\dot{N}_s$ and $\dot{F}_s$ are the vector forces acting on the rotor axis;
$R_e$ is the equivalent horizontal distance of the point of application of the force vector $\dot{F}$ from the flexure 17 bending point as shown in FIGURE 10;
$h_n$ and $h_f$ are the distances from the rotor axis to the flexure 17 bending force shown in FIGURE 10.

It is desirable to transform the vector forces $\dot{N}_s$ (near side) and $\dot{F}_s$ (far side) at the bearing points 5 and 6, and 5' and 6' as shown in FIGURE 9 into suitable weights $W_1$ and $W_2$ located in planes 150 and 151, respectively. In FIGURE 9, the distance between the bearings is indicated as length L. The distance from bearings 5 and 6 to plane 150 is $a$, the distance between planes 150 and 151 is $b$, and the distance between plane 151 and bearings 5' and 6' is $c$.

It will be appreciated that the distances between bearings and the respective balance weight planes may vary from rotor to rotor and similarly, distances $h_f$ and $h_n$ from the bending points of flexures 17 and 17' to the axis of the rotor shaft may also vary. The relationship between forces in the balance weight planes and forces in the bearing planes determines constants such as $$K_{n1} = +\frac{a+b}{b}$$

$$K_{n2} = -\frac{a}{b}$$

$$K_{f2} = +\frac{b+c}{b}$$

$$K_{f1} = -\frac{c}{b}$$

These constants may be readily acquired from the particular test stand utilized and the nature of the rotor being tested.

In order to transform the vector forces $\dot{N}_s$ and $\dot{F}_s$ to suitably located weights, requires utilization of the centrifugal force equation; wherein $$F = \frac{W}{g} \times r\omega^2$$

where

F is force in lbs.;
g is the gravity constant;
r is the radius on which the balance weight is placed;
W is the equivalent weight in lbs.;
$\omega$ is the rotational speed of the shaft in radians/second.

Combining the above relationships gives the equations for the two balance weights $W_1$ and $W_2$ required to balance the rotor. These equations are also arranged in the order they are solved in the computer.

$$-\dot{W}_1 = \left(\frac{-\dot{N}}{h_n} \times \frac{1}{\text{r.p.m.}^2} \times \frac{K_{n1}}{r_1} + \frac{\dot{F}}{h_f} \times \frac{1}{\text{r.p.m.}^2} \times \frac{K_{f1}}{r_1}\right) \times C \times R_e$$

$$\dot{W}_2 = \left(\frac{\dot{F}}{h_f} \times \frac{1}{\text{r.p.m.}^2} \times \frac{K_{f2}}{r_2} + \frac{-\dot{N}}{h_n} \times \frac{1}{\text{r.p.m.}^2} \times \frac{K_{n2}}{r_2}\right) \times C \times R_e$$

In FIGURE 8 angle $\theta_F$ which is determined by testing the far side of the rotor (shown in FIGURES 1 and 3) indicates the angle of the vector force supplied to the computer from the input selsyn 155 and the angle $\theta_N$ is determined from the near side of the test stand and is supplied to input selsyn 156. Stator windings 157 and 159 of selsyns 155 and 156 are connected to conductors 161, 162, 163, which are connected to a suitable motor generator 154 which supplies three phase excitation. After adjusting rotors 158 and 160 of selsyn motors 155 and 156 which are restrained in a manner similar to rotor 44 of selsyn motor 43 to the angles derived from balancing the near and far sides of the test stand shown in FIGURES 1 and 3, calibrated potentiometers 164 and 175 are adjusted to register the forces F and N which are taken from force measuring voltmeter 92 in FIGURE 3.

The information $\theta_F$ and $\dot{F}$ is supplied to operational amplifier 165 which may be a conventional analogue computing device and which is associated with a potentiometer 166 into which may be supplied the values $h_f$ for the particular rotor and test stand being utilized. Similarly, information $\theta_N$ and N is supplied to operational amplifier 176 and potentiometer 177 supplies $h_n$ to the computer. The analogue results from the operational amplifier 165 are passed to operational amplifier 167 at which point the speed of the rotor is supplied through potentiometer 168. The product of this multiplication is passed to operational amplifier 169 where again the speed of the rotor is supplied at potentiometer 170 (the square of the speed is utilized in the centrifugal force equation). Similarly, the product from operational amplifier 176 is passed to operational amplifer 178 at which point the speed at which the near side was tested is entered by potentiometer 179 into the computer and this information is repeated at operational amplifier 180 through potentiometer 181. Previously mentioned constants $K_{n1}$, $K_{n2}$, $K_{f1}$, $K_{f2}$, $r_1$, and $r_2$ are then introduced, this information being supplied through potentiometers 171, 172, 182, and 183. Operational amplifiers 184 and 185 supply the results $\dot{W}_1$ and $\dot{W}_2$ in analogue form to terminal points 186 and 187, respectively. Switch 188 is connected to a suitable oscilloscope 190 to supply thereto the analogue information from terminals 186 and 187.

The analogue information at terminal points 186 and 187 is not in a usable form and reference or indicating means is required to determine the angular location and magnitude of weights to be placed in planes 150 and 151 shown in FIGURE 9. To achieve this end, reference selsyns 195 and 196 are utilized. Stators 197 and 199 of these selsyns are connected to the conductors 161, 162, and 163 which are also connected to power supply 154. A calibrated potentiometer 201 is associated with restrained rotor 198 of selsyn motor 195. Similarly, rotor 200 of selsyn motor 196 is associated with calibrated potentiometer 202. The reference potentiometers and selsyn motors are associated through terminal points 193 and 194 with switch 191 which is also connected to oscilloscope 199. By means of switch construction 188, the analogue information of $\dot{W}_2$ from the computer is applied to the oscilloscope 190.

Initially, by supplying a signal to the oscilloscope from selsyn motor 195 and potentiometer 201 while simultaneously supplying $\dot{W}_2$ in analogue form through switch 188, the oscilloscope usually will show a general oval shape. As the reference selsyn motor 195 has its rotor 198 suitably adjusted so that the vector angle of the signal is substantially the same as that of weight $\dot{W}_2$, the oval will change into an inclined line on oscilloscope 190. By suitably manipulating potentiometer 201 until the magnitude of the signal substantially equals the magnitude of $\dot{W}_2$, the inclined line becomes a horizontal line indicating that the reference signal from reference selsyn 195 and potentiometer 201 has matched the analogue product from the analogue computer. By reading the calibrated potentiometer and selsyn rotor angle, this electricial information is directly transformed into a weight and angle specification for plane 151 of rotor 9. The operation may be repeated to determine $W_1$ and its location on plane 150.

In the operation of the apparatus illustrated in FIG-

URES 1, 3, and 8, a suitable rotor to be balanced is mounted upon the test stand 2 and attached by a suitable flexible coupling to a motor 14, the jacks on the near side of the apparatus are disengaged from the stand while the jacks 18' and 19' on the far side of the stand engage the stand to restrain movement thereof. The rotor is then rotated at a desired speed, for example, less than 300 r.p.m. The cantilever spring 25 which is connected by means of link 29 to stand 2 is rotated to vary the effective moment of inertia of the cantilever beam and in such a manner, the stiffness of the spring is varied to permit a condition of resonance at the desired speed to exist wherein the rotor end which is not restrained may consequently vibrate with considerable amplitude. To assure that excessive amplitude of vibration does not occur, the dash pot 95 shown in FIGURE 3 may be utilized to limit vibration.

At this point it is desirable to generate a force equal and opposite to the vector force which is generated by the unbalance of the rotating rotor. In order to achieve the proper vector angle, rotor 44 of selsyn motor 43 is suitably manipulated until the phase of the vector force applied to balance the rotor begins to substantially eliminate the rotor vibration. This condition may be readily measured by the transducer 82 which registers the displacement of the stand in a manner which can be directly read on the peak reading voltmeter 85. Having generated a compensating force in phase with the vibration of the rotor by manipulating rotor 44 of selsyn motor 43, the angle of the force vector may be determined on the calibrated rotor. By manipulating potentiometer 52, the force applied to restrain the unbalanced rotor may be varied until a minimum amplitude condition is achieved wherein the applied force is equal in magnitude and opposite in phase to the unbalance force in the rotor. The unbalance force may be determined from peak reading voltmeter 92 which measures the force applied by the force generator 20.

Having determined the vector force angle and the magnitude of the force applied to the near end of the test stand 2, the compensating vector force for the far side may be determined by repeating the operation on the other end.

The magnitude and direction of the compensating forces required on the near and far sides is supplied to input selsyn motors 155 and 156 and associated potentiometers 164 and 175. This analogue information is utilized in the operational amplifiers wherein the physical dimensions of the rotor and stand are included with the speed of the rotor during the test resulting in a determination in analogue form of the weights to be utilized in planes 150 and 151 (illustrated in FIGURE 9). In order to transform this analogue information into weights located at specific points on the rotor, reference selsyn motors are utilized. Initially, the magnitude $W_2$ is determined and supplied in analogue form to the oscilloscope 190. This information is supplied through terminal point 186, switch 188 to the oscilloscope. Simultaneously, switch 191 is associated with terminal 193, connecting selsyn motor 195 and potentiometer 201 to the oscilloscope. By duly manipulating the rotor of selsyn motor 195, the phase angle $\theta_2$ at which $W_2$ is to be mounted on rotor 9 in plane 151 is determined. By manipulating potentiometer 201 until the desired horizontal line is formed on the oscilloscope, the value of the weight may be read on the calibrated potentiometer 201. To determine the position and magnitude of $W_1$, switch 188 is connected to terminal point 187 and switch 191 is connected to terminal 194. The previous operation is repeated to determine the angle $\theta_1$ and the weight of $W_1$.

The present invention presents a method and apparatus for balancing rotors wherein the rotor is dynamically balanced in a manner wherein the rotor need only be rotated and stopped once. Analogue information is acquired which may be readily translated into suitable weights to be mounted upon the rotor at specific locations to swiftly and effectively balance the rotor, avoid the approximate determinations and the numerous tests normally required in trial and error methods presently being utilized.

While there has been described a preferred embodiment of our invention, it will be understood that our invention is not limited thereto since it may be otherwise embodied within the scope of the appended claim.

What we claim as new and desire to secure by Letters Patent of the United States is:

In an apparatus for balancing an unbalanced rotor, the combination of a stand having a plurality of bearing means for mounting a rotor thereon, flexure means being vertically in alignment with each bearing means, means for rotating the unbalanced rotor, variable remotely controlled cantilever spring means operatively connected to each bearing means, force-applying means operatively associated for applying sinusoidal vector forces to each bearing means, a first selsyn rotor being connected to the rotor, a first selsyn stator inductively associated with the first selsyn rotor, a second selsyn stator being connected electrically to the first selsyn stator, a second selsyn rotor being inductively associated with the second selsyn stator, said second selsyn rotor being adapted to be adjustable in angular position, said second selsyn rotor being associated with the force-applying means to determine the phase angle at which forces are applied to the bearing means to balance the unbalance forces on the rotor, means for varying the magnitude of the forces applied to the bearing means, means for measuring the vector forces applied to the bearing means, means for translating the vector forces applied to the bearing means into analogue signals for conversion into suitably located balancing weights to be located on the rotor at spaced points to balance the unbalanced forces thereon.

References Cited by the Examiner

UNITED STATES PATENTS

| | | | |
|---|---|---|---|
| 1,639,444 | 8/27 | Terry | 73—468 |
| 2,054,267 | 9/36 | Ohlson | 73—464 |
| 2,737,813 | 3/56 | Allen | 73—468 |
| 2,754,685 | 7/56 | Lansky | 73—468 |
| 2,779,196 | 1/57 | Hemmeter | 73—458 |
| 2,780,939 | 2/57 | Kellogg | 73—458 |
| 2,911,146 | 11/59 | Lanneau et al. | 235—180 |
| 2,923,477 | 2/60 | Newell | 235—180 |
| 2,980,331 | 4/61 | Gruber et al. | 73—462 |
| 3,034,330 | 5/62 | Jaworowicz | 73—468 |

OTHER REFERENCES

Reuland, German application 1,049,607, Jan. 29, 1959.

RICHARD C. QUEISSER, *Primary Examiner.*

CORNELIUS D. ANGEL, ROBERT L. EVANS, JAMES J. GILL, WALTER W. BURNS, *Examiners.*